United States Patent Office 3,795,693
Patented Mar. 5, 1974

3,795,693
OMEGA CYANOPERFLUOROALKANOYL
FLUORIDES
Edwin Dorfman, William E. Emerson, and Russell L. K.
Carr, Grand Island, N.Y., assignors to Hooker Chemical Corporation, Niagara Falls, N.Y.
No Drawing. Continuation of abandoned application Ser.
No. 56,671, July 20, 1970, which is a continuation-in-part of application Ser. No. 661,242, Aug. 17, 1967, now Patent No. 3,557,165, dated Jan. 19, 1971. This application July 28, 1972, Ser. No. 275,986
Int. Cl. C07c 121/16
U.S. Cl. 260—465.4  3 Claims

ABSTRACT OF THE DISCLOSURE

Omega cyanoperfluoroalkanoyl fluorides are prepared in high yields by reacting omega cyanoperfluoroalkanoates in the presence of a Lewis acid. The fluorides are useful intermediates in the preparation of perfluoroalkylenetriazine polymers.

---

This is a continuation of application Ser. No. 56,671, filed July 20, 1970, now abandoned, which was a continuation-in-part of application Ser. No. 661,242, filed Aug. 17, 1967, now U.S. Pat. 3,557,165, issued Jan. 19, 1971.

This invention relates to a new process for preparing compositions of matter classified as ω-cyanoperfluoroalkanoyl chlorides, and to ω-cyanoperfluoroalkanoyl fluorides, bromides and iodides, as new compositions of matter.

In Ser. No. 573,195, filed Aug. 18, 1966, now U.S. 3,349,105, the ω-cyanoperfluoroalkanoyl chloride compounds produced by the process of the present invention are disclosed and claimed by C. J. Verbanic. The method used by Verbanic in producing the chloride compounds however, under some circumstances, produces the compounds in relatively low yields with other products which may or may not be of practical use. A different process was therefore sought, which is the subject of this invention. The discovered process of this invention is also disclosed as Example 14 in the said Ser. No. 573,195/66.

In accordance with the present invention, ω-cyanoperfluoroalkanoyl halides of the formula

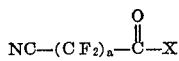

and X is selected from chlorine, bromine, fluorine and iodine, wherein $a$ is from 1 to 12, are formed when polyhaloalkyl ω-cyanoperfluoroalkanoates and polyhaloaralkyl ω-cyanoperfluoroalkanoates of the formula

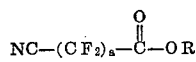

where $a$ is as defined above and R is selected from polyhaloalkyl and polyhaloaralkyl of 1 to 25 carbon atoms with at least two halogen atoms on the carbon atom adjacent to the oxygen of the oxycarbonyl group, are decomposed in the presence of a Lewis acid, and the product is recovered preferably by distillation. Halogen R is chosen from chlorine and fluorine.

The catalysts which have been found to be especially effective are Lewis acids which are selected from the group consisting of ferric chloride, antimony pentachloride, zirconium tetrachloride, and zinc chloride. Other Lewis acids, aluminum chloride and titanium tetrachloride, have been tested for catalytic activity for this reaction but have a much lower order of activity. Still other Lewis acids such as boron trifluoride, boron trichloride, molybdenum pentachloride, tin chlorides and metal chlorides, fluorides, bromides and iodides such as zirconium tetraiodide and antimony bromide may have more or less activity for the catalysis of this reaction.

Sodium fluoride is not a Lewis acid and has relatively little catalytic activity for the process of this invention.

Lewis acids of the metal halides of fluorine, bromine and iodine may be used in greater than catalytic amounts to convert the polyhaloalkyl ω-cyanoperfluoroalkanoates and polyhaloaralkyl ω-cyanoperfluoroalkanoates to the corresponding ω-cyanoperfluoroalkanoyl fluorides, bromides and iodides in situ, that is, in one operational step, thus avoiding the recovery of ω-cyanoperfluoroalkanoyl chlorides as a separate step. The ω-cyanoperfluoroalkanoyl halides may also be prepared in situ in one operational step by treating the polyhaloalkyl ω-cyanoperfluoroalkanoates and polyhaloaralkyl ω-cyanoperfluoroalkanoates with a mixture of Lewis acid in catalytic amount, and excess metal halide where the halogen is selected from fluorine, bromine and iodine, and the metal is chosen from Groups I, II, III, IV, V, VIb and VIII of the Periodic Table.

In the absence of a catalyst, the lower-boiling species of polyhaloalkyl ω-cyanoperfluoroalkanoates and polyhaloaralkyl ω-cyanoperfluoroalkanoates are distilled overhead rather than converted to the acid chlorides under the conditions of our process.

A catalytic amount of the Lewis acid is to be used, preferably between about 1.0 to about 15 percent by weight.

In the above statement of the invention R is polyhaloalkyl or polyhaloaralkyl of from 1 to 25 carbon atoms with at least two halogen atoms on the carbon atom adjacent to the oxygen in the oxycarbonyl group. Illustrative of such groups are:

trichloromethyl,
dichloromethyl,
polychloroethyl,
pentachloroethyl,
tetrachloroethyl,
dichlorotrifluoroethyl, and
dichlorobenzyl, and the like.

Thus, where R is trichloromethyl and $x$ is 3, then the starting material is trichloromethyl ω-cyanofluorobutyrate; when $x$ is 2, trichloromethyl ω-cyanoperfluoroheptanoate, when $x$ is 6, trichloromethyl ω-cyanoperfluoroheptanoate, and when $x$ is 8, trichloromethyl ω-cyanoperfluorononanoate. Also, when R is tetrachloroethyl and $x$ is 3, then the starting material is tetrachloroethyl ω-cyanoperfluorobutyrate, and when $x$ is 6, tetrachloroethyl ω-cyanoperfluoroheptanoate, etc.

A preferred R group is trichloromethyl which is economical to prepare and which gives carbonyl chloride as a by-product. Higher molecular weight groups such as dichloroperfluoroalkyl groups of 6 to 14 carbon atoms would also be desirable in the synthesis of lower members of the series for these would give by-product acid chlorides which would be easily separated by distillation.

The polyhaloalkyl ω-cyanoperfluoroalkanoate and polyhaloaralkyl ω-cyanoperfluoroalkanoate starting materials for the process of this invention are prepared by photochlorination of the corresponding alkyl ω-cyanoperfluoroalkanoates and aralkyl ω-cyanoperfluoroalkanoates, described in copending application Ser. No. 661,180 filed Aug. 17, 1967, now U.S. Pat. 3,532,725, issued Oct. 6, 1970.

The corresponding alkyl ω-cyanoperfluoroalkanoates and aralkyl ω-cyanoperfluoroalkanoates are produced by treatment with $P_2O_5$ of the corresponding perfluoroalkyl-eneamidate in accordance with Equation I:

(I)

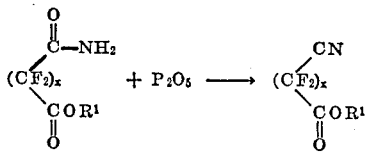

where $R^1$ is alkyl or aralkyl of 1 to 25 carbon atoms, and $x$ is as defined above. This is described in copending application Ser. No. 661,241, filed Aug. 17, 1967, now U.S. Pat. 3,535,351 issued Oct. 20, 1970.

The amidate is produced either by (a) treatment with ammonia of a perfluorinated dicarboxylic acid ester of the formula

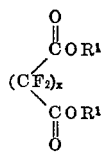

where $x$ and $R^1$ are as defined above, or (b) by treatment with an alcohol of the imide of the perfluorodicarboxylic acid, in accordance with Equation II:

(II)

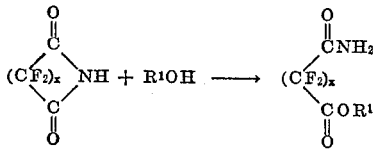

where $x$ and $R^1$ are defined as above. This is described in copending application Ser. No. 661,240, filed Aug. 17, 1967, now U.S. Pat. 3,544,618 issued Dec. 1, 1970. The diesters and imides are known compositions. An example of a dialkyl perfluoroalkylene dicarboxylic is dimethyl perfluoroglutarate which was prepared by A. L. Hanne and W. J. Zimmerscheid, J. Am. Chem. Soc., 67, 1235 (1945). Another example is dimethyl perfluorosebacate which was prepared by treatment of perfluorosebacoyl chloride with methanol, and recovering the diester by vacuum distillation: B.P. 120–122 at 4 mm. Perfluorosebacoyl chloride, B.P. 115–7 at 36 mm., was prepared from the acid in 86% yield using a fourfold quantity of thionyl chloride, ethyl acetate as solvent, and a catalytic amount of pyridine. Perfluorosebacic acid and perfluorotetradecanedioic acid are known compounds described by I. L. Knunyants et al., Proc. Acad. Sci. U.S.S.R., 129, 328 (1959) and I. L. Knunyants and M. N. Krasuskaya, Bull. Acad. Sci. U.S.S.R., 1963, 190. Dipropyl perfluorosebacate was prepared from perfluorosebacic acid, n-propyl alcohol and a catalytic amount of sulfuric acid. The by-product water of reaction was removed by distillation of the propyl alcohol-water azeotropic mixture. The dipropyl perfluorosebacate had a boiling point of 125–128° centigrade at 5 millimeters of mercury pressure (absolute). Diethyl difluoromalonate or dimethyl difluoromalonate may be produced by the method of C. E. Inman, R. E. Oesterling, and E. S. Tyczkowski, J. Am. Chem. Soc., 80, 6533–5 (1958). Perfluoropimelic acid, perfluoroazelaic acid and perfluorononanedioic acid may be made by electrolytic fluorination of the corresponding hydrocarbon acids by the method of Guenther, U.S. Pat. 2,606,206, which gave perfluorosebacic acid. The esters of these acids can be made by the procedures used for the preparation of the perfluorosebacic acid esters described above. Examples of imides are perfluorosuccinimide and perfluoroglutarimide, which were prepared by the method of A. L. Henne and W. F. Zimmer, J. Am. Chem. Soc., 73, 1103 (1951). Other homologous perfluoroalkanedioic acid imides may be prepared by this process when the corresponding perfluoroalkanedioic acid amides are used as starting materials.

The reaction is carried out at relatively low temperature of between about 100 degrees centigrade to about 200 degrees centigrade, with a preferred range being between about 140 and about 180 degrees centigrade. Above about 200 degrees centigrade side reactions involving the nitrile group may occur. Below about 100 degrees centigrade the reaction is relatively slow.

In the absence of a catalyst the reaction is too slow and the result is to distill the more volatile polyhaloalkyl ω-cyanoperfluoroalkanoates, rather than decompose them to the corresponding acid chlorides.

The reaction of this invention can be conducted under atmospheric pressure. However, pressures above and below atmospheric pressure may also be used.

Where the product is recovered from the reaction mixture by distillation, the pressure to be used depends on the boiling point of the product. That is, where the atmospheric boiling point of the product is above the reaction temperature range, then vacuum may be applied in order to recover the product at a lower temperature.

A crude product may be distilled over and then further purified such as by redistillation.

Anhydrous conditions are to be maintained during the reaction to avoid formation of the hydrolysis products of the polyhaloalkyl ω-cyanoperfluoroalkanoates and of the ω-cyanoperfluoroalkanoyl chlorides.

An inert solvent may be used which may lower the reaction temperature; however, it is not necessary.

The process of this invention not only includes recovery of the product as the acid chloride, but also embraces the corresponding acid fluorides, acid bromides and acid iodides, which can be produced by a subsequent halogen exchange reaction using metal halides where the halogen is selected from bromine, fluorine and iodide, and the metal is chosen from Groups I, II, III, IV, V, VI$b$ and VIII of the Periodic Table. Examples of such metal salts are potassium hydrogen fluoride ($KHF_2$), potassium fluoride, calcium bromide, aluminum bromide, silicon bromide, zirconium tetraiodide, antimony bromide, molybdenum hexafluoride, ferric bromide, ferric iodide and the like.

Thus, the compositions claimed by this invention are defined by the formula:

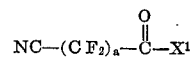

where $a$ is from 1 to 12 and $X^1$ is selected from fluorine, bromine and iodine. A preferred subclass of compound in this class of compounds is where $X^1$ is fluorine.

The cyanoperfluoroalkanoyl chlorides may be used to prepare the corresponding cyanoperfluoroalkanoyl fluorides, cyanoperfluoroalkanoyl bromides, and cyanoperfluoroalkanoyl iodides. Thus, it has been found that when the acid chloride is heated and stirred with potassium bifluoride, the acid fluoride is formed and may be recovered by fractional distillation. A polar solvent and other metal fluorides may also be used for the halogen exchange reaction.

To make the acid bromides and acid iodides a similar halogen exchange reaction may be used which employs bromide and iodide salts and the cyanoperfluoroalkanoyl chloride. The cyanoperfluoroalkanoyl iodides may be prepared by heating the acid chloride with anhydrous calcium iodide. The cyanoperfluoroalkanoyl bromides may be prepared by heating the acid chloride with excess finely divided anhydrous calcium bromide.

The cyanoperfluoroalkanoyl fluorides are useful as intermediates for photodecomposition reactions where ultraviolet radiation below 2400 angstrom units is used, which would give perfluoroalkane dinitriles. The cyanoperfluoroalkanoyl chlorides, bromides, and iodides would give a larger amount of the corresponding cyanoperfluoroalkyl chlorides, bromides, and iodides, and substantially less of the perfluoroalkane dinitriles. This may be due to the more facile cleavage of the carbon-chlorine, carbon-bromine, and carbon-iodide chemical bond by photoactivation as compared to that of the carbon-fluorine bond.

Thus, compounds produced by the process of this invention are:

cyanodifluoroacetyl chloride, when $a=1$
ω-cyanotetrafluoropropionyl chloride, when $a=2$
ω-cyanohexafluorobutyryl chloride, when $a=3$
ω-cyanooctafluorovaleryl chloride, when $a=4$
ω-cyanodecafluorohexanoyl chloride, when $a=5$
ω-cyanododecafluoroheptanoyl chloride, when $a=6$
ω-cyanotetradecafluorooctanoyl chloride, when $a=7$
ω-cyanohexadecafluorononanoyl chloride, when $a=8$
ω-cyanooctadecafluorodecanoyl chloride, when $a=9$
ω-cyanoperfluoroundecanoyl chloride, when $a=10$
ω-cyanoperfluorododecanoyl chloride, when $a=11$
ω-cyanoperfluorotridecanoyl chloride, when $a=12$
ω-cyanohexafluorobutyryl fluoride, when $a=3$
ω-cyanohexafluorobutyryl bromide, when $a=3$
ω-cyanooctafluorovaleryl bromide, when $a=4$
ω-cyanohexafluorobutyryl iodide, when $a=3$
ω-cyanooctafluorovaleryl iodide, when $a=4$
α-cyanodifluoroacetyl fluoride, when $a=1$
ω-cyanotetrafluoropropropionyl fluoride, when $a=2$
ω-cyanooctafluorovaleryl fluoride, when $a=4$
ω-cyanodecafluorohexanonyl fluoride, when $a=5$
ω-cyanododecafluoroheptanoyl fluoride, when $a=6$
ω-cyanotetradecafluorooctanoyl fluoride, when $a=7$
ω-cyanohexadecafluorononanoyl fluoride, when $a=8$
ω-cyanooctadecafluorodecanoyl fluoride, when $α=9$
ω-cyanoperfluoroundecanoyl fluoride, when $a=10$
ω-cyanoperfluorododecanoyl fluoride, when $a=11$
ω-cyanoperfluorotridecanoyl fluoride, when $a=12$
and the like.

By this process, at the same time a second product is also prepared such as phosgene when R is trichloromethyl.

The cyanoperfluoroalkanoyl halides produced by the process of this invention are useful in the preparation of perfluoroalkylenetriazine polymers, such as those disclosed in copending application S.N. 533,430, filed Mar. 11, 1966, now U.S. Pat. 3,734,976 issued May 22, 1973. These polymers are thermally stable and resistant to some solvents, while being soluble in other solvents, such as alkyl acetates, alkyl perfluoroalkanoates, and fluorinated solvents such as fluorinated xylenes and fluorine-containing triazines.

The cyanoperfluoroalkanoyl halides may also be treated with perfluorinated carboxylic acids to evolve hydrogen halides and to produce mixed perfluorinated carboxylic anhydrides. These mixed anhydrides may also be used to prepare perfluoroalkylenetriazine polymers of application S.N. 533,430 and thus represent an economical method of recovering the by-product acids which are formed in the polymerization process of application S.N. 533,430. Illustrative mixed anhydrides of this type are the following:

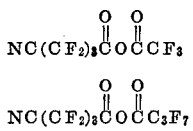

This invention is further illustrated in examples below, wherein temperatures are in degrees centigrade and parts are by weight.

EXAMPLE 1

ω-Cyanoperfluorononanoyl chloride

Trichloromethyl ω - cyanoperfluorononanoate (25.1 grams), and ferric chloride (3 grams), were heated in a distilling apparatus to 140 degrees centigrade in 2 hours, and then to 160 degrees centigrade in 1.5 hours. A vacuum (52 millimeters mercury) was then applied and the distillate was collected in cuts: Cut 1, 15.6 grams, boiling point 99–102 degrees centigrade, 89.5 percent pure by gas liquid chromatographic analysis; and Cut 2, 3.0 grams, boiling point 102–110 degrees centigrade, 92.2 percent pure by gas liquid chromatographic analysis. Analysis: Calculated for $C_{10}Cl_{16}NO$: C, 24.53; F, 62.10; N, 2.86; Found: C, 24.72; H, 0.00; N, 3.10; yield 79%. The infrared spectrum, was characteristic for nitrile and acid chloride with bands at 2250 and 1800 reciprocal centimeters, respectively.

In a similar manner, by substituting trichloromethyl ω-cyanododecafluoroheptanoate (20.8 grams) for the trichloromethyl ω-cyanohexadecafluorononanoate used in the above reaction, ω-cyanododecafluoroheptanoyl chloride is obtained.

In a similar manner, by substituting trichloromethyl ω-cyanooctafluoropentanoate (16.5 grams) for the trichloromethyl ω-cyanohexadecafluorononanoate used in the above reaction, ω-cyanooctafluoropentanoyl chloride can be obtained.

EXAMPLE 2

ω-Cyanoperfluorobutyryl chloride

Trichloromethyl ω-cyanoperfluorobutyrate, (577 parts), and ferric chloride, (10.5 parts), were heated in distillation equipment at 120 to 140 degrees centigrade. Carbonyl chloride and ω-cyanoperfluorobutyryl chloride, (300 parts), were collected. The crude product was fractionated using a helix-packed column to yield ω-cyanoperfluorobutyryl chloride, (264 parts), with a boiling point of 74–75.5 degrees centigrade. Analysis: Calculated for $C_5ClF_6NO$: C, 25.07; Cl, 14.80; F, 47.60; N, 5.85. Found: C, 25.15; H, 0.00; N, 5.58. The infrared spectrum was identical with that obtained from a sample which was made by the reaction of perfluoroglutaramide with benzoyl chloride which is described in the said Verbanic patent application.

In a similar manner, by substituting trichloromethyl ω-cyanotetrafluoropropionate (492 grams) for the trichloromethyl ω-cyanoperfluorobutyrate used in Example 2, ω-cyanotetrafluoropropionyl chloride can be obtained.

In a similar manner, by substituting trichloromethyl ω-cyanodifluoroacetate (406 grams) for the trichloromethyl ω-cyanoperfluorobutyrate used in Example 2, cyanodifluoroacetyl chloride can be obtained.

EXAMPLE 3

ω-Cyanoperfluorobutyryl chloride from dichloromethyl ω-cyanoperfluorobutyrate

Dichloromethyl ω-cyanoperfluorobutyrate, boiling point 70 degrees centigrade at 50 millimeters of mercury pressure, was obtained by photochlorination of methyl ω-cyanoperfluorobutyrate in accordance with Example 2. Chlorine analysis: 22.9%. Theory: 23.5%. Heating of the dichloromethyl ester, (70 parts), with ferric chloride, (2.5 parts), at 170 degrees centigrade gave distillate, (37 parts), of ω-cyanoperfluorobutyryl chloride having 75% purity.

EXAMPLE 4

ω-Cyanoperfluorobutyryl chloride-ferric chloride catalyst

Trichloromethyl ω-cyanoperfluorobutyrate, (22 parts), and ferric chloride, (1 part), were combined in a distillation apparatus and heated in an oil bath at 150 degrees centigrade. ω-Cyanoperfluorobutyryl chloride, (11 parts), was collected in the distillate. A distillation residue of 3 parts containing higher boiling materials was also obtained.

In comparison with Example 10 below it can be seen that ferric chloride catalysis gives a much higher yield of ω-cyanoperfluoroalkanoyl chloride and at a lower reaction temperature than a non-Lewis acid material such as sodium fluoride.

EXAMPLE 5

ω-Cyanoperfluorobutyryl chloride-aluminum chloride catalyst

Trichloromethyl ω-cyanoperfluorobutyrate, (22 parts), and aluminum chloride, (1 part), were combined in a distillation apparatus and heated in an oil bath at 150 degrees centigrade. A distillate, (1.6 parts), was obtained which contained 1% of ω-cyanoperfluorobutyryl chloride.

EXAMPLE 6

ω-Cyanoperfluorobutyryl chloride-titanium chloride catalyst

Trichloromethyl ω-cyanoperfluorobutyrate, (22 parts), and titanium chloride, (1 part), were combined in a distillation apparatus and heated in an oil bath at 180 degrees centigrade. The distillate was 4.2 parts, containing 1% of ω-cyanoperfluorobutyryl chloride but was essentially trichloromethyl ω-cyanoperfluorobutyrate.

EXAMPLE 7

ω-Cyanoperfluorobutyryl chloride-zinc chloride catalyst

Trichloromethyl ω-cyanoperfluorobutyrate, (22 parts), and zinc chloride, (1 part), were combined in a distillation apparatus and heated in an oil bath at 180 degrees centigrade. ω-Cyanoperfluorobutyryl chloride, (11.2 parts), was collected in the distillate.

EXAMPLE 8

ω-Cyanoperfluorobutyryl chloride-zirconium chloride catalyst

Trichloromethyl ω-cyanoperfluorobutyrate, (22 parts), and zirconium chloride, (1 part), were combined in a distillation apparatus and heated in an oil bath at 150 to 178 degrees centigrade. The distillate was 7.6 parts containing 72% of ω-cyanoperfluorobutyryl chloride.

EXAMPLE 9

ω-Cyanoperfluorobutyryl chloride-antimony pentachloride catalyst

Trichloromethyl ω-cyanoperfluorobutyrate, (22 parts), and antimony pentachloride, (1 part), were combined in a distillation apparatus and heated in an oil bath at 140 to 150 degrees centigrade. ω-Cyanoperfluorobutyryl chloride, (9.2 parts), was obtained in the distillate.

EXAMPLE 10

ω-Cyanoperfluorobutyryl chloride-sodium fluoride catalyst

Trichloromethyl ω-cyanoperfluorobutyrate (10 parts), and sodium fluoride, (1 part), were combined in a distillation apparatus and heated in an oil bath. The temperature of the bath was slowly increased but no reaction occurred until the temperature reached 190 degrees centigrade. ω-Cyanoperfluorobutyryl chloride, (1.2 grams), was collected at a reaction temperature of 190 to 210 degrees centigrade.

EXAMPLE 11

ω-Cyanoperfluorobutyryl chloride from tetrachloroethyl ω-cyanoperfluorobutyrates A mixture of tetrachloroethyl ω-cyanoperfluorobutyrates, (40 parts), and ferric chloride, (5 parts), were combined in a distillation apparatus and heated in an oil bath at 150 to 180 degrees centigrade. The distillate, (14 parts), contained 45% of ω-cyanoperfluorobutyryl chloride.

Preparation of polyhaloalkyl ω-cyanoperfluoroalkanoate starting materials

In accordance with Ser. No. 661,180, filed Aug. 17, 1967, now U.S. Pat. 3,532,725, issued Oct. 6, 1970, the starting materials are prepared in the following illustrative manner.

EXAMPLE 12

Trichloromethyl ω-cyanohexafluorobutyrate

Methyl 4-cyanoperfluorobutyrate, 39.0 grams, was treated with chlorine gas in a 3-necked round bottomed flask with stirring at 50–70 degrees centigrade. Distillation at 26–34 degrees centigrade and 0.10 mm. mercury, gave 20.5 grams of distillate. Analysis: Calculated for $$C_6Cl_3F_6NO_2$$

C, 20.68; Cl, 30.53; N, 4.02. Found: C, 21.47; Cl, 31.28; N, 4.28.

In a similar manner, by substituting methyl ω-cyanotetrafluoropropionate (30.7 grams) for the methyl ω-cyanoperfluorobutyrate used in the above reaction, trichloromethyl ω-cyanotetrafluoropropionate can be obtained.

In a similar manner, by substituting methyl ω-cyanodifluoroacetate (22.4 grams) for the methyl ω-cyanoperfluorobutyrate used in the above reaction, trichloromethyl ω-cyanodifluoroacetate can be obtained.

Preparation of alkyl ω-cyanoperfluoroalkanoate and aralkyl ω-cyanoperfluoroalkanoate starting materials In accordance with S.N. 661,241, filed Aug. 17, 1967, now U.S. Pat. 3,535,351 issued Oct. 20, 1970, the derivative starting materials are prepared in the following illustrative manner.

EXAMPLE 13

Methyl ω-cyanohexadecafluorononanoate

A mixture of methyl perfluorosebacamidate (61 grams) and phosphorus pentoxide (185 grams) was heated in a bath maintained at about 200 degrees centigrade. After 15 minutes the pressure was reduced to 35 millimeters mercury to permit distillation of the product. Distillate (50.5 grams) boiling at 111–113 degrees centigrade was collected during the next two hours. The distillate was redistilled at 35 millimeters to give a fraction (39 grams) boiling at 112 to 115 degrees centigrade. Analysis: Calculated for $C_{11}H_3F_{16}NO_2$: C, 27.23; H, 0.62; N, 2.89. Found: C, 27.14; H, 0.87; N, 2.91.

In a similar manner, by substituting methyl perfluorosuberamidate (48.8 grams) for the methyl perfluorosebacamidate used in the above reaction, methyl ω-cyanododecafluoroheptanoate can be obtained.

In a similar manner, by substituting methyl perfluoroadipamidate (36.7 grams) for the methyl perfluorosebacamidate used in the above reaction, methyl ω-cyanooctafluoropentanoate can be obtained.

In a similar manner, by substituting n-propyl perfluorosebacamidate (64.4 grams) for the methyl perfluorosebacamidate used in the above reaction, n-propyl ω-cyanohexadecafluorononanoate can be obtained.

Preparation of perfluoroamidate starting materials from diester

In accordance with S.N. 661,240, filed Aug. 17, 1967, now U.S. Pat. 3,544,618, issued Dec. 1, 1970, the derivative starting materials are prepared from the diester in the following illustrative manner.

EXAMPLE 14

Methyl perfluorosebacamidate

To dimethyl perfluorosebacate (252 grams, 0.48 mole), in methylene chloride (700 milliliters), was added ammonia (5.8 grams, 0.34 mole), at between about 25 to about 29 degrees centigrade. The mixture was stirred for 7 hours. Cooled methyl perfluorosebacamidate (110 grams) was obtained at 100 degrees centigrade at 0.25 millimeter mercury. This product was recrystallized from toluene which gave white crystals (61 grams) with a melting point of between 115 and 116 degrees centigrade.

Analysis: Calculated for $C_{11}H_5F_{16}NO_3$: C, 26.26; H, 1.00; N, 2.78. Found: C, 26.13; H, 1.06; N, 2.84.

In a similar manner by substituting dimethyl perfluorosuberate (201 grams, 0.48 mole), for the dimethyl perfluorosebacate used in the above reaction, methyl perfluoroseberamidate can be obtained.

In a similar manner, by substituting methyl difluoromalonate (81 grams, 0.48 mole), for the dimethyl perfluorosebacate used in the above reaction, methyl difluoromalonamidate can be obtained.

In a similar manner, by substituting methyl perfluoroadipate (152.5 grams, 0.48 mole), for the dimethyl perfluorosebacate used in the above reaction, methyl perfluoroadipamidate can be obtained.

Preparation of perfluoroamidate starting materials from the imide

In acordance with S.N. 661,240, filed Aug. 17, 1967, now U.S. Pat. 3,544,618, issued Dec. 1, 1970, the derivative starting materials are prepared from the imide in the following illustrative manner.

EXAMPLE 15

Methyl perfluoroglutaramidate

Perfluoroglutarimide (5 grams, 0.023 mole) and methanol (0.79 gram, 0.0246 mole), were sealed in a tube and heated to about 100 degrees centigrade. In 50 minutes the reaction was almost complete as indicated by infrared analysis. Heating was continued for about 90 minutes more to complete the reaction. A solid product was recrystallized from toluene and dried. It had a melting point of 45.0–45.5 degrees centigrade. Analysis: Calculated for $C_6H_5F_6NO_3$: C, 28.47; H, 1.99; N, 5.53. Found: C, 28.40; H, 1.99; N, 5.62.

In a similar manner, by substituting perfluorosuccinimide (3.93 grams, 0.023 mole), for the perfluoroglutarimide used in the above reaction, methyl perfluorosuccinamidate can be obtained.

EXAMPLE 16

Preparation of 4-cyanoperfluorobutyryl fluoride

A mixture of 4-cyanoperfluorobutyryl chloride (49 grams, 0.204 mole), and anhydrous $KHF_2$ (17 grams, 0.218 mole), was heated with stirring, under nitrogen to 118 degrees centigrade. ω-Cyanohexafluorobutyryl fluoride distilled from the mixture as it was formed, and 25 grams were isolated with a boiling point of 43–45 degrees centigrade, in a 54.7 percent yield.

In a similar manner, by substituting ω-cyanoperfluorovaleryl chloride (59.2 grams) for the ω-cyanoperfluorobutyryl chloride used in the above reaction, ω-cyanoperfluorovaleryl fluoride can be obtained.

In a similar manner, by substituting ω-cyanoperfluoroheptanoyl chloride (79.5 grams) for the ω-cyanoperfluorobutyryl chloride used in the above reaction, ω-cyanoperfluoroheptanoyl fluoride can be obtained.

In a similar manner, by substituting ω-cyanoperfluorononanoyl chloride (100 grams) for the ω-cyanoperfluorobutyryl chloride used in the above reaction, ω-cyanoperfluorononanoyl fluoride can be obtained.

In the manner after Example 16 where the acid bromide is desired, 4-cyanoperfluorobutyryl chloride is treated with excess finely divided, anhydrous calcium bromide and the 4-cyanoperfluorobutyryl bromide is recovered by distillation.

In a manner after Example 16 where the acid iodide is desired, 4-cyanoperfluorobutyryl chloride is treated with excess finely divided anhydrous calcium iodide, and the 4-cyanoperfluorobutyryl iodide is then recovered by distillation.

Although this invention has been illustrated by citing specific details of given species embraced within the scope of the invention, it is to be understood that various modifications within the invention are possible, some of which have been referred to above.

For instance, ω - cyanoperfluoroetheralkanoyl halides may be made. These compounds have the formulae:

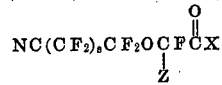

and

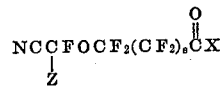

where $s$ is an integer of from 0 to 12, X is selected from the group consisting of chlorine, bromine, iodine, and fluorine, and Z is selected from the group consisting of fluorine and trifluoromethyl ($CF_3$),

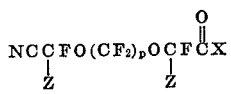

where $p$ is an integer of from 2 to 12, and X and Z are as defined above,

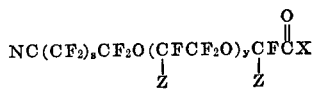

and

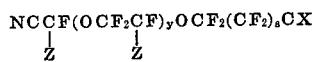

where $y$ is an integer of from 0 to 100, and $s$, X and Z are as defined above,

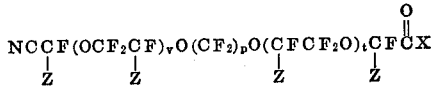

where $v$ plus $t$ is an integer of from 0 to 100, and $p$, X, and Z are as defined above, and

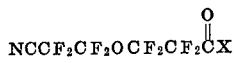

where X is as defined above,

Illustrative compounds embraced by this process are:

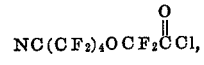

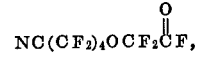

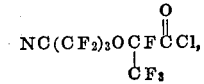

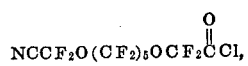

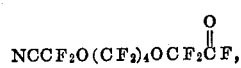

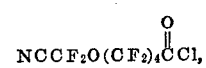

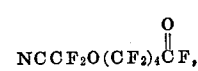

and

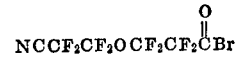

Other compounds embraced by this process are ω-cyano-perfluoroalkanoyl halides of branched perfluoroalkanedioic acids such as the following examples:

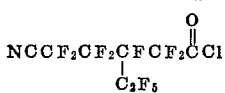

and

What is claimed:
1. A compound of the formula

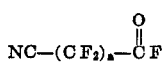

wherein $a$ is from 1 to 12.

2. The compound of claim 1 wherein $a$ is 3.
3. The compound of claim 1 wherein $a$ is 4.

References Cited
UNITED STATES PATENTS
3,349,105  10/1967  Verbanic _____ 260—404

OTHER REFERENCES
Wagner and Zook, "Synthetic Organic Chemistry," 1953, John Wiley, New York, p. 548.

JOSEPH PAUL BRUST, Primary Examiner

U.S. Cl. X.R.
260—404

UNITED STATES PATENT OFFICE
CERTIFICATE OF CORRECTION

Patent No. 3,795,693  Dated March 5, 1974

Inventor(s) Edwin Dorfman et al

It is certified that error appears in the above-identified patent and that said Letters Patent are hereby corrected as shown below:

Column 2, line 47, "ω-cyanofluorobutyrate" should read ---ω-cyanoperfluorobutyrate---; line 48, "ω-cyanoperfluoroheptonoate" should read ---ω-cyanoperfluoropropionate---.
Column 3, line 39, "A.L. Hanne" should read ---A.L. Henne---.

Signed and sealed this 16th day of July 1974.

(SEAL)
Attest:

McCOY M. GIBSON, JR.
Attesting Officer

C. MARSHALL DANN
Commissioner of Patents